United States Patent

[11] 3,572,055

[72] Inventor Peter R. Billey
 17 Stillman St., South Dartmouth, Mass. 02748
[21] Appl. No. 849,845
[22] Filed Aug. 13, 1969
[45] Patented Mar. 23, 1971

[54] MARINE-TYPE FLEXIBLE COUPLING
 4 Claims, 3 Drawing Figs.
[52] U.S. Cl. .................................................. 64/11
[51] Int. Cl. .................................................. F16d 3/52
[50] Field of Search .......................................... 64/11, 31

[56] References Cited
UNITED STATES PATENTS
2,667,768  2/1954  Winkler et al. ............... 64/11

Primary Examiner—Fred C. Mattern, Jr.
Assistant Examiner—Randall Heald
Attorney—Eyre, Mann & Lucas ABSTRACT: A marine-type flexible coupling comprising hubs attached to the drive shaft and the propeller shaft connected by a loose-fitting elastomeric sleeve held on the hubs by pins passing through the sleeve into the hubs which is capable of handling (1) angular misalignment which occurs when the connected shafts are not parallel or not coaxial; (2) parallel offset alignment which occurs when the connected shafts are parallel but not coaxial; and (3) combined shaft offset and angular misalignment which occurs when the connected shafts are not parallel and their centerlines do not intersect.

INVENTOR.
PETER R. BILLEY
BY Eyre, Mann & Lucas
ATTORNEYS

INVENTOR.
PETER R. BILLEY

MARINE-TYPE FLEXIBLE COUPLING

The present invention relates to a marine-type flexible coupling for transmitting power from the drive shaft to the propeller shaft in powerboats with inboard drive.

There are a number of marine-type flexible couplings now on the market. Most of these are satisfactory for handling the angular misalignment between the shafts that normally occurs in a powerboat with inboard drive, but none of these are satisfactory for handling the misalignment that occurs when the two shafts are parallel but offset relative to each other. Propeller shaft whip is the most annoying and destructive vibration that can normally occur in a powerboat and is usually caused by a propeller shaft that is not perfectly straight, (i.e., has some initial runout) or by a propeller wheel that does not run true due to a bent blade, unbalanced wheel or other wheel defects. The whip in the long, unsupported length of the driven shaft causes the forward coupled end of this shaft, which is just ahead of the stuffing box bearing, to gyrate and tries to carry around with it the driving half of the coupling. This gyration is, in effect, a condition of combined angular and parallel offset misalignment. The whip force tries to throw the rear end of the engine around in a circle. However, the mass of the engine tends to keep it in a fixed position. This causes the stuffing box bearing and the part of the boat that holds it to vibrate. As engine speed is increased, the magnitude of the whip increases. This not only shakes the entire boat, but also puts great stress on the bearing. As the bearing succumbs to the great stress on it and wears away, the vibration becomes even greater.

The coupling of the present invention greatly reduces the vibration of the boat and stress on the bearing caused by shaft whip. It does this by compensating for both parallel and angular misalignment of the shafts.

In a preferred embodiment of the invention two hubs are employed. One hub is attached to the free end of the drive shaft and the other to the propeller shaft. The hubs are connected by a flexible elastomeric sleeve having an inside diameter greater than the outside diameter of the hubs. The sleeve is held in place on the hubs by pins which pass through the sleeve and into the hubs.

The coupling will accommodate considerable angular misalignment due to the elasticity of the sleeve. The offset of the shafts due to parallel misalignment is accommodated by the space between the hubs and the interior of the sleeve. The loose fit between the coupling and the shafts does not create a problem, because as soon as the shafts start to rotate the looseness disappears due to forces acting in radial direction outwardly on the sleeve.

These and other features of the present invention can best be understood by reference to a preferred embodiment shown in the drawings in which.

Figure 1:
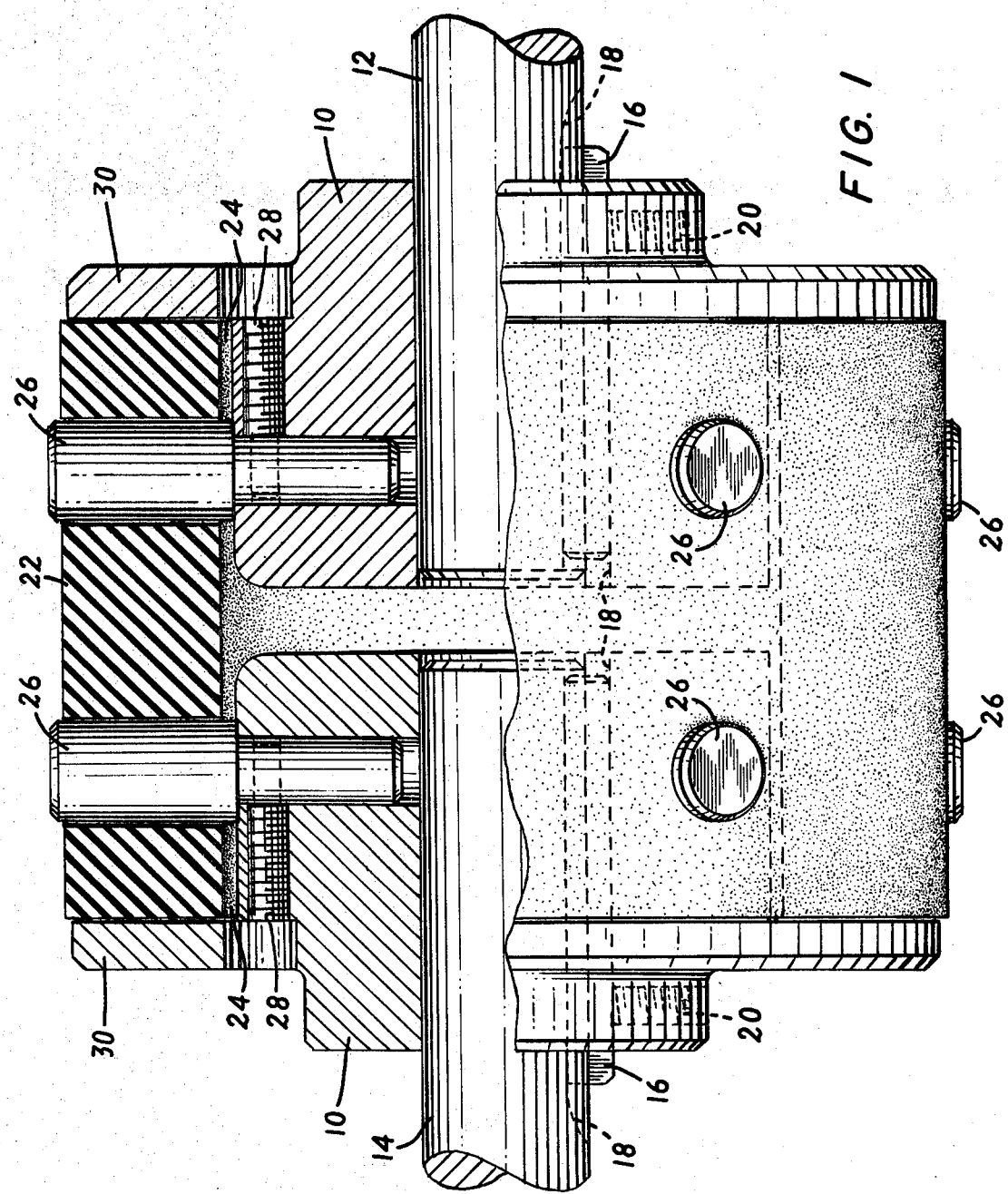
FIG. 1 illustrates the coupling with the upper front quadrant cut out.

In the drawings, the same number is employed for identical parts of the described structures. In the preferred structure shown in the drawings, a metal hub 10 is attached to the free end of the drive shaft 12 and propeller shaft 14 as by means of a key 16 fitted into the keyway 18 positioned in the hub and the shaft. The key prevents rotational slippage while setscrews 20 hold the hub on the shafts. If desired, the hubs may be attached to the shaft in any other convenient manner. The hubs need not be used if the shaft is oversized and the pins can be attached directly to the shaft. Normally, however, hubs will be required since propeller shafts are usually made to handle their rated torque and would not be strong enough if weakened by holes for the pins. The flexible coupling 22 comprises an elastomeric sleeve preferably of plastic such as the polyurethane employed in the structure shown in the drawings. The sleeve is fitted over the adjacent ends of the hubs and the inside diameter of the hub to provide a space 24 between the hubs and the sleeve. In the preferred structure shown, the inside diameter of the sleeve is 1/32-inch greater than the outside diameter of the hubs which is 4 inches throughout that portion enclosed by the sleeve. The propeller and drive shafts are 1¼ inches in diameter and the thickness of sleeve 22 is approximately equal to the diameter of the shaft. A plurality of pins 26 hold the flexible coupling sleeve 22 in place on the hubs and in the structure shown six pins are equally spaced around each hub. The bottom portion of the pin which fits into the hub is one-half inch in diameter while the top portion of the pin positioned in the sleeve has a diameter of three-fourths inch. Setscrews 28 hold the pins 26 in place on the hub. The structure shown is designed to accommodate a motor of up to about 200 hp. at 2,000 r.p.m. The specific dimensions of the parts and the number of pins will, of course, be varied depending upon the job at hand and the materials used in the structure.

In the preferred structure shown, the flexible coupling 22 is free to slide on pins 26 so that radial forces will cause the coupling to move outwardly away from the hubs to tighten the loose fit provided by the space 24. An annular flange 30 may be positioned on each hub to provide a channel for the flexible coupling in place on the hubs, and to transfer forward thrust from the propeller shaft hub through the flexible element to the engine-side hub, thence to the thrust bearing within the engine unit. While it is of great advantage to provide a space 24 between the coupling and hubs in order to compensate for parallel misalignment, this space may be eliminated and the coupling may be tightly fitted on the hubs or shafts in those cases where it is desirable to limit the compensation primarily to the angular misalignment between the shafts.

Figure 2:
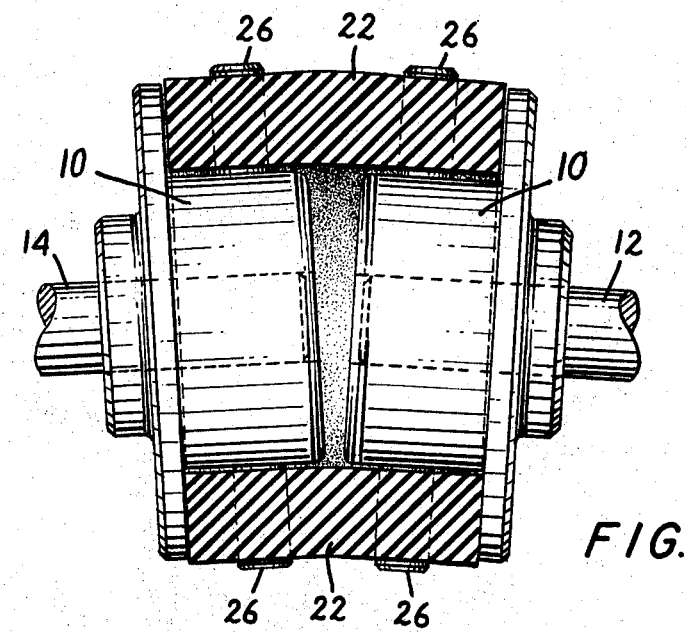
FIG. 2 shows the coupling with the shafts in angular misalignment.

FIG. 2 illustrates angular misalignment of the shafts 12 and 14 which are connected by the preferred embodiment of the coupling. In this case, the elastomeric sleeve 22 is elongated on the top and compacted on the bottom. The elastomeric sleeve is not greatly distorted and as a result there is not much stress on the stuffing box and stern bearings. The amount of angular misalignment allowed depends primarily on the elasticity and thickness of the sleeve.

Figure 3:
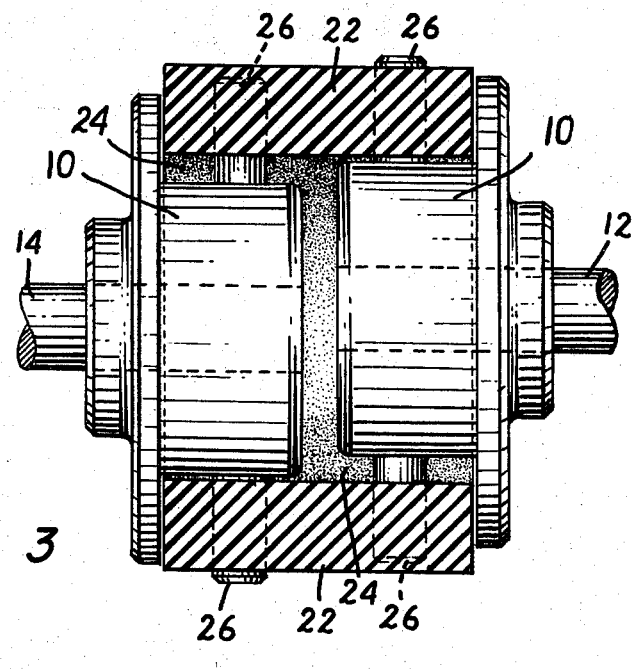
FIG. 3 shows the coupling with the shafts in parallel misalignment.

FIG. 3 illustrates in an exaggerated fashion the way in which the present coupling allows for parallel misalignment. The drive shaft 12 and the propeller shaft 14 are parallel to each other, but offset perpendicularly. Because of the space 24 between the sleeve 22 and the hubs 10, the shafts can compensate for parallel offset without distorting the sleeve 22. The capacity of the sleeve to compensate for parallel offset may be changed by changing the space between the sleeve and hubs. The greater the space, the greater the capacity of the sleeve to compensate for parallel offset of the shafts.

It will be understood that it is intended to cover all changes and modifications of the preferred embodiment of the invention herein chosen for illustration which do not constitute departures from the spirit and scope of the invention.

I claim:

1. A flexible coupling which comprises an elastomeric sleeve, means for attaching said sleeve to a drive shaft and a driven shaft, said sleeve having its inside diameter greater than the outside diameter of said shafts to provide a space between the shafts and the inside of said sleeve, wherein said sleeve is free to move relative to the means for attaching the sleeve to said shafts.

2. A flexible coupling which comprises two hubs, means for attaching said hubs to a drive shaft and a driven shaft, an elastomeric sleeve with an inside diameter greater than the outside diameter of that part of the hub over which it fits, and means for attaching said sleeve to said hubs, wherein said sleeve is free to move relative to said means for attaching said sleeve to said hubs.

3. The coupling of claim 2 wherein said attachment means comprises a plurality of pins which pass through said sleeve and are firmly held in said hubs.

4. The coupling of claim 3 wherein said sleeve is free to move radially outward on the pins with respect to said shafts.